US009181896B2

(12) United States Patent
Pauls

(10) Patent No.: US 9,181,896 B2
(45) Date of Patent: Nov. 10, 2015

(54) BEARING BUSHING FOR A CONNECTING ROD, COMBINATION OF A CONNECTING ROD AND A BEARING BUSHING, AND METHOD FOR PRODUCING SAME

(71) Applicant: Rudolf Pauls, Wolfsburg (DE)

(72) Inventor: Rudolf Pauls, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 146 days.

(21) Appl. No.: 13/923,392

(22) Filed: Jun. 21, 2013

(65) Prior Publication Data

US 2013/0276741 A1    Oct. 24, 2013

Related U.S. Application Data

(63) Continuation of application No. PCT/EP2011/006431, filed on Dec. 20, 2011.

(30) Foreign Application Priority Data

Dec. 22, 2010 (DE) .......................... 10 2010 055 518

(51) Int. Cl.
*F16C 7/00* (2006.01)
*F02F 3/00* (2006.01)
(Continued)

(52) U.S. Cl.
CPC . *F02F 3/00* (2013.01); *F16C 7/023* (2013.01); *F16C 9/04* (2013.01); *F16C 33/04* (2013.01); *F16J 7/00* (2013.01); *Y10T 29/49288* (2013.01)

(58) Field of Classification Search
CPC .............. F16C 9/04; F16C 9/045; F16C 7/02; F16C 7/023
USPC ...................... 123/197.3; 29/888.092, 888.09; 384/216, 268, 270, 430
See application file for complete search history.

(56) References Cited

U.S. PATENT DOCUMENTS 6,329,022 B1   12/2001   Schlegel et al.
6,367,151 B1   4/2002    Schlegel et al.
(Continued)

FOREIGN PATENT DOCUMENTS

CN   1192391 A    9/1998
DE   3614532 A1   11/1987
(Continued)

OTHER PUBLICATIONS

Search Report issued by the German Patent and Trademark Office for German Patent Application No. DE 10 2010 055 518.5, dated Nov. 11, 2011.
(Continued)

*Primary Examiner* — Hung Q Nguyen
(74) *Attorney, Agent, or Firm* — Manfred Beck, P.A.

(57) ABSTRACT

A bearing bushing for a connecting rod and a combination of a connecting rod and a bearing bushing are provided. The connecting rod has a small end which includes a bearing bore. A first region of the bearing bore, which in operation is subjected to compressive loading, is longer than a second region of the bearing bore which is subjected to tensile loading. In order to modify a bearing bushing and a connecting rod so that with simple production and optimized weight the connecting rod has good bearing properties for the piston pin, the bearing bushing already has, before insertion thereof into the bearing bore, a shape adapted to the end edge contour of the bearing bore, wherein the first region of the bearing bushing is likewise longer than the second region thereof. A method of producing such a small end is also disclosed.

11 Claims, 4 Drawing Sheets

(51) Int. Cl.

| | | |
|---|---|---|
| *F16C 7/02* | (2006.01) | |
| *F16C 9/04* | (2006.01) | |
| *F16C 33/04* | (2006.01) | |
| *F16J 7/00* | (2006.01) | |

(56) References Cited

U.S. PATENT DOCUMENTS

| | | | |
|---|---|---|---|
| 6,379,754 B1 | 4/2002 | Schlegel et al. | |
| 6,513,238 B1 | 2/2003 | Schlegel | |
| 6,540,403 B1 | 4/2003 | Damour | |
| 6,560,869 B1 | 5/2003 | Schlegel et al. | |
| 7,240,584 B1 | 7/2007 | Luehrmann et al. | |
| 7,516,546 B2 * | 4/2009 | McEwan | 29/888.09 |
| 7,581,315 B2 * | 9/2009 | McEwan | 29/888.09 |
| 8,245,687 B2 * | 8/2012 | Lapp et al. | 123/197.3 |
| 8,613,137 B2 * | 12/2013 | Lapp et al. | 29/888.092 |
| 2006/0101939 A1 * | 5/2006 | McEwan | 74/579 R |
| 2012/0055019 A1 * | 3/2012 | McEwan | 29/888.092 |
| 2014/0116373 A1 * | 5/2014 | Jiang et al. | 123/197.3 |

FOREIGN PATENT DOCUMENTS

| | | | | |
|---|---|---|---|---|
| DE | 3733982 | A1 | 4/1989 | |
| DE | 4133586 | A1 * | 12/1992 | F02B 75/32 |
| DE | 19828847 | A1 | 2/2000 | |
| DE | 10129559 | C1 | 11/2002 | |
| EP | 1803946 | A2 | 7/2007 | |
| EP | 1818551 | A1 | 8/2007 | |

OTHER PUBLICATIONS

International Search Report for International Application No. PCT/EP2011/006431, completed Mar. 21, 2012.
International Preliminary Report on Patentability for International Application No. PCT/EP2011/006431, including amended sheets and translation thereof, dated Dec. 4, 2012.

* cited by examiner

BEARING BUSHING FOR A CONNECTING ROD, COMBINATION OF A CONNECTING ROD AND A BEARING BUSHING, AND METHOD FOR PRODUCING SAME

CROSS-REFERENCE TO RELATED APPLICATIONS

This application is a continuation, under 35 U.S.C. §120, of copending International Application No. PCT/EP2011/006431, filed Dec. 20, 2011, which designated the United States; this application also claims the priority, under 35 U.S.C. §119, of German Patent Application No. DE 10 2010 055 518.5, filed Dec. 22, 2010; the prior applications are herewith incorporated by reference in their entirety.

BACKGROUND OF THE INVENTION

Field of the Invention

The invention relates to a bearing bushing for a connecting rod having a small end, which has a bearing bore, in particular for receiving a pin of an engine piston of a combustion engine, wherein a first region of the bearing bore, which in operation is subjected to compressive loading, is longer than a second region of the bearing bore, which is subjected to tensile loading. Moreover, the invention relates to a combination of a connecting rod and a bearing bushing and to a method for producing same.

Connecting rods are used to transmit the force generated by the ignition pressure from the pistons to the crankshaft of combustion engines.

German Patent No. DE 101 29 559 C1 discloses a connecting rod having a small end. The embodiment of the small end to receive the piston pin is designed in such a way that a circular segment of the small end has a bearing bore, wherein the lower half of the bearing bore is longer than the other half of the bearing bore formed thereabove in the upper circular segment of the small end. An optimum bearing configuration in the small end is thereby preferentially obtained in the principal state of loading of the piston. Instead of using a bearing bushing to support the piston pin, the bearing bore is filled with cast lead bronze. Lubrication of the piston pin in the bearing bore must be provided by means of appropriate bores and recesses in the connecting rod and in the small end, and this is associated with a corresponding production outlay.

The prior art furthermore includes connecting rods on which the small piston rod eye is of trapezoidal design. The side faces of the connecting rod eye run obliquely to the longitudinal axis of the connecting rod, with the result that the bearing width facing the piston is smaller than that directed toward the rod-shaped section of the connecting rod. Normally, the connecting rod eye is supposed to be provided with a plain bearing bushing. A receptacle for lubricant is provided by allowing elastic deformation of the external shape of the eye to take on a slightly oval shape under load. Trapezoidal connecting rods, on which the side faces of the small connecting rod eye are provided with simple cylindrical concave curvature at the width of the piston pin diameter, are also known (German Patent Application Publication No. DE 37 33 982 A1). The practice of uniformly chamfering the edges of the bearing bore and of the bearing bushing of the small connecting rod eye has also been described.

U.S. Pat. Nos. 7,516,546 B2 and 7,581,315 B2 describe how a connecting rod having a bushing received in an eye of the connecting rod can be produced by receiving a bushing blank in the eye of the unprocessed connecting rod and then jointly forming the connecting rod and the bushing blank to produce a stepped contour of the side face of the eye with a matching contour of the bushing received. Similarly, European Patent Application Publication No. EP 1 803 946 A2 describes forming an assembly including a connecting rod and a bushing blank jointly in a single step.

German Patent Application No. DE 198 28 847 A1, DE 36 14 532 A1, U.S. Pat. Nos. 7,240,584 B1 and 6,513,238 B1 each show a bearing bushing for a connecting rod having a small end which has a bearing bore, wherein a first region of the bearing bore, which in operation is subjected to compressive loading, is longer than a second region of the bearing bore, which is subjected to tensile loading, wherein the bearing bushing, when unconnected to the connecting rod, has a shape matched to the final edge contour of the bearing bore, wherein the first region of the bearing bushing is likewise designed to be longer than the second region thereof.

SUMMARY OF THE INVENTION

Taking the above as a starting point, it is the underlying object of the invention to develop a bearing bushing and a connecting rod in such a way and to propose a production method such that the connecting rod has good bearing properties for the piston pin while being simple to produce and/or having an optimized weight.

On the one hand, this object is achieved by a bearing bushing for a connecting rod having a small end, which has a bearing bore, wherein a first region of the bearing bore, which in operation is subjected to compressive loading, is longer than a second region of the bearing bore, which is subjected to tensile loading, wherein the bearing bushing, when unconnected to the connecting rod, has a shape matched to a final edge contour of the bearing bore, wherein a first region of the bearing bushing is likewise configured to be longer than a second region thereof, wherein the first regions both of the small end, of the bearing bore and of the bearing bushing merge into the respective second regions via a curvated profile.

The object of the invention is also achieved by a combination of a connecting rod having a small end, which has a bearing bore, in particular for receiving a pin of an engine piston of a combustion engine, wherein a first region of the bearing bore, which in operation is subjected to compressive loading, is longer than a second region of the bearing bore, which is subjected to tensile loading, and of a bearing bushing received in the bearing bore, the shape of which is matched to the final edge contour of the bearing bore, wherein the first region of the bearing bushing is likewise designed to be longer than the second region thereof and wherein the bearing bushing is configured as defined above, i.e. the bearing bushing is a bearing bushing for a connecting rod having a small end, which has a bearing bore, wherein a first region of the bearing bore, which in operation is subjected to compressive loading, is longer than a second region of the bearing bore, which is subjected to tensile loading, wherein the bearing bushing, when unconnected to the connecting rod, has a shape matched to the final edge contour of the bearing bore, wherein the first region of the bearing bushing is likewise designed to be longer than the second region thereof, wherein the first regions both of the small end, of the bearing bore and of the bearing bushing merge into the respective second regions via a curvated profile.

The object of the invention is furthermore achieved by achieved by a method for producing a combination of a connecting rod having a small end and of a bearing bushing by boring a bearing bore into the small end, wherein a first region of the bearing bore, which in operation is subjected to compressive loading, is longer than a second region of the bearing bore, which is subjected to tensile loading, wherein a bearing bushing, the shape of which before insertion is already matched to the final edge contour of the bearing bore, is inserted into the bearing bore, wherein the bearing bushing is configured as defined above; i.e. the bearing bushing is a bearing bushing for a connecting rod having a small end, which has a bearing bore, wherein a first region of the bearing bore, which in operation is subjected to compressive loading, is longer than a second region of the bearing bore, which is subjected to tensile loading, wherein the bearing bushing, when unconnected to the connecting rod, has a shape matched to the final edge contour of the bearing bore, wherein the first region of the bearing bushing is likewise designed to be longer than the second region thereof, wherein the first regions both of the small end, of the bearing bore and of the bearing bushing merge into the respective second regions via a curvated profile.

The invention provides a bearing bushing for a connecting rod having a small end which has a bearing bore, in particular for receiving a pin of an engine piston of a combustion engine. When unconnected to the connecting rod, the bearing bushing has a shape matched to the final edge contour of the bearing bore, in particular even before it is inserted into the bearing bore and/or before it is inserted into the bearing bore for the first time. The bearing bushing according to the invention is preferably already finish-machined.

The first region of the bearing bore, which in operation is subjected to compressive loading, is preferably part of a circular bore (also referred to as the small eye) or is the lower half of the bore. The second region, which is subjected to tensile loading, is preferably part of the circular bore or is the lower half of the bore. The first region of the bearing bore is designed to be longer than the second region of the bearing bore, wherein the first and also the second region extend transversely to the longitudinal axis of the connecting rod. According to the invention, it is now envisaged that a bearing bushing, the shape of which is matched to the final shape of the edge of the bearing bore, is arranged in or pressed into the bearing bore, i.e. the first region (lower (component) half or lower circular segment) of the bearing bushing, when unconnected to the connecting rod, is likewise designed to be longer than the second region of the bearing bushing (the upper (component) half). As a result, there is no need to finish-machine the bearing bushing in the bearing bore by machining in a trapezium or by chamfering, and therefore the production process is simplified, preferably optimized. The bearing bushing can also be referred to as a bearing shell.

There is no stepped section provided between the two (first and second) regions; instead, the regions merge into one another in a curvate manner. Both in the case of the small end itself and of the bearing bushing, the shape is also referred to as a "handbasket shape". This handbasket shape is an advantageous, preferably optimum, compromise between the bearing properties and weight saving.

The first region of the small end preferably has a stop collar or is correspondingly chamfered. The separate, press-fitted bearing bushing is designed in such a way that it ends with the stop collar. In this way, optimum bearing properties are achieved despite a reduced use of material.

For weight optimization, the connecting rod is preferably designed with an optimized structure. For this purpose, the connecting rod shaft preferably has edge ribs which follow the external shape of the shaft and run out toward the big end—substantially in a conical shape. In this configuration, the ribs extend almost as far as the parting joint between the connecting rod shaft and the connecting rod bearing cover. Another feature of the optimization of the structure while simultaneously saving weight can be that the inner surface of the shaft is narrow and/or runs in a constant manner as far as a stop collar of the large eye.

To reduce the weight, the connecting region of the connecting rod bearing cover (or the flat) can furthermore be of narrower design. There is then a slim bearing cover with comparatively shorter screws.

According to the invention, a connecting rod optimized for weight and/or costs is produced by a process in which, in a first step, a small end having a first, longer and a second, shorter region is formed with a bearing bore that is still closed, subsequently the bearing bore is introduced and then a bearing bushing matched to the shape of the bearing bore is pressed into the bore.

According to a preferred embodiment, the small end or the small end together with the connecting rod is produced by forging. The small end then already has a characteristic shape, which is also referred to as a "handbasket shape". During the forging process, a rounded edge of the small end is also already shaped to give the bearing bore. There follows the production of the stop collar of the bearing bore, preferably by plain milling. The prepared bearing bore is then enlarged. After this, the bearing bushing, likewise in the form of a "handbasket", is pressed into the bearing bore or circular segment. This production sequence has the advantage that both the small end and the bearing bushing are given their final shape essentially by preliminary processes, making the actual production process significantly quicker and/or simpler. The machining of the small end as a trapezium or subsequent process steps for chamfering the stop collar are eliminated.

According to another feature of the invention, the combination of a connecting rod and of a bearing bushing is characterized in that the small end has a stop collar on the first region thereof, and the separately inserted bearing bushing ends with the stop collar.

According to another feature of the invention, the combination of a connecting rod and of a bearing bushing is characterized in that a connecting rod shalt formed integrally on the small end has edge ribs which follow the external shape of the shaft and run out toward the big end.

According to another feature of the invention, the combination of a connecting rod and of a bearing bushing is characterized in that the combination has a connecting rod bearing cover secured to the connecting rod and having shoulders for receiving connecting means, and the connecting region which extends between the shoulders and is remote from the connecting rod shaft is of narrow design.

According to another feature of the invention, the combination of a connecting rod and of a bearing bushing is characterized in that the connecting means are embodied as screws.

According to another feature of the invention, the method for producing a combination of a connecting rod having a small end and of a bearing bushing is characterized in that a small end having a first, longer and a second, shorter region is formed with a bearing bore that is still closed, in that the bearing bore is introduced and in that the bearing bushing is pressed into the bore.

According to another feature of the invention, the method for producing a combination of a connecting rod having a small end and of a bearing bushing is characterized in that the small end is forged.

According to another feature of the invention, the method for producing a combination of a connecting rod having a small end and of a bearing bushing is characterized in that after the small end has been shaped, a stop collar is introduced in the first region of the small end.

According to another feature of the invention, the method for producing a combination of a connecting rod having a small end and of a bearing bushing is characterized in that the stop collar is formed by plain milling.

Other features which are considered as characteristic for the invention are set forth in the appended claims.

Although the invention is illustrated and described herein as embodied in a bearing bushing for a connecting rod, a combination of a connecting rod and a bearing bushing, and a method for producing the combination of a connecting rod and a bearing bushing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1C:
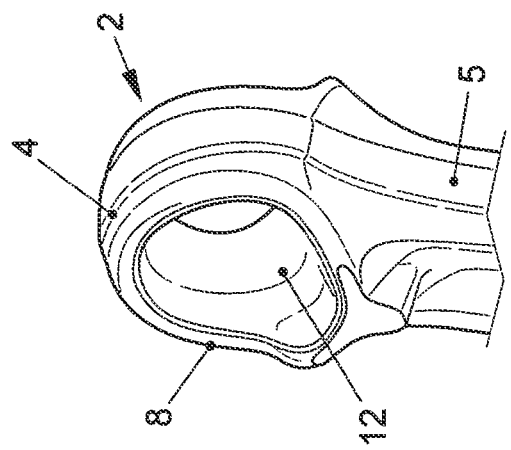
FIGS. 1a to 1c are diagrammatic perspective views of a small end for illustrating a production sequence according to the invention for the small end according to the invention.
Figure 1B:
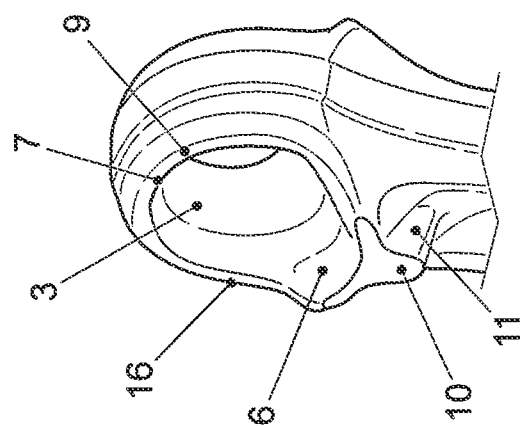
Figure 1A:
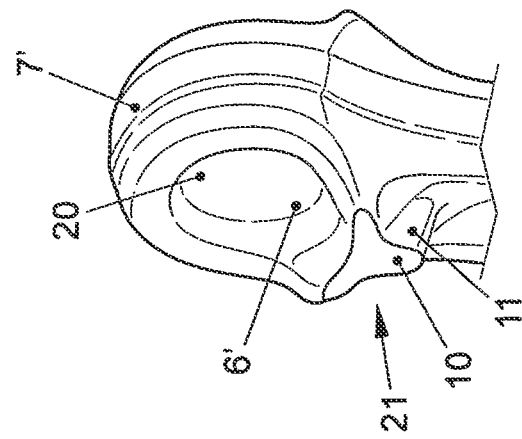

Referring now to the figures of the drawings in detail and first, particularly, to FIGS. 1a to 1c thereof, there is shown a sequence of three steps for the production of the connecting rod (1; cf. FIG. 3) according to the invention having a small end 2.

The small end 2 includes a central bearing bore 3 as the small eye and is designed as a circular segment 4. The small end 2 merges integrally into the connecting rod shaft 5. The first, lower region 6'—in this case part of the lower half—is designed to be longer transversely to the shaft axis than a second, upper region 7'—in this case part of the upper half.

In contrast to the design of the small end in German Patent No. DE 101 29 559 C1, the transition 8 between the first region 6' or lower shell and the upper region 7' or upper she is not of stepped design but is smooth. As a result, the lower shell—which is made longer—is connected to the upper shell—which is made shorter—in the form of a curve. Overall, therefore, this results in a small end 2 in the form of a "handbasket". The same applies to the contour of the bearing bore.

The lower region 6' runs into a stop collar 10, which has approximately the shape of a triangle owing to a reinforcing rib 11 toward the connecting rod shaft 5. Owing to the optimized shape, the wall thickness of the small end 2 can be given smaller dimensions in relation to known connecting rods. After the bearing bore 3 has been bored, the final edge contour 9 of the bearing bore 3 is fixed. The outer edges of the small end toward the bearing bore are rounded.

The separate bearing bushing 12 is pressed into the bearing bore 3. The essential point is that the bearing bushing 12 already has a shape that corresponds to the subsequent final shape or edge profiles of the bearing bore in the state of the bearing bush in which it is unconnected to the connecting rod 1, in particular before an initial connection to the connecting rod 1 and/or before the press-fitting process.

Figure 2:
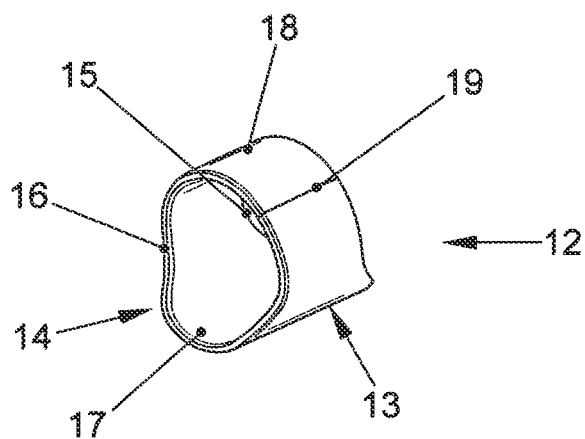
FIG. 2 is a diagrammatic perspective view of a preferred embodiment of a bearing bushing configured according to the invention and matched to the contour of the bearing bore of the small end.

The bearing bushing 12 or sleeve is shown in detail in FIG. 2. It is based on a cylindrical main body 13, which does not have any straight edges at the ends 14, 15 thereof but has a curved or curvate edge profile 16. Here, the first, lower region 17 of the bushing 12 is designed to be longer than the second, upper region 18. The edge contour extends in a curvate manner from the longer region 17 into the shorter region 18. Before being pressed in, the bearing bushing 12 thus likewise has a "handbasket shape". It has a seam 19 which extends parallel to the longitudinal axis thereof in the circumference of the bushing. This seam 19 is produced as a butt seam.

The production method for the small end 2 (FIGS. 1a to 1c) will be explained below. The upper and lower regions 6', 7' of the small end 2 are already matched to the subsequent final contour thereof and are produced by forging. The bearing bore 3 is indicated by a depression 20 (cf. FIG. 1a) and is still closed. The lower or first region 6' is formed so as to project. A reinforcing rib 11 extends out of the upper region of the connecting rod shaft 5. This projecting part 21 is shaped into a stop collar 10 by plain miffing. In a second step, the bearing opening is bored in (FIG. 1b). The result is the final edge contour of the bearing bore 3, which likewise has a first, longer region 6 and a second, shorter region 7. The bearing bushing 12, a "handbasket bushing", is then pressed into the bearing bore 3. Process steps such as the machining of a trapezoidal shape with subsequent chamfering of the bearing bore and the bearing bushing are eliminated.

Figure 3:
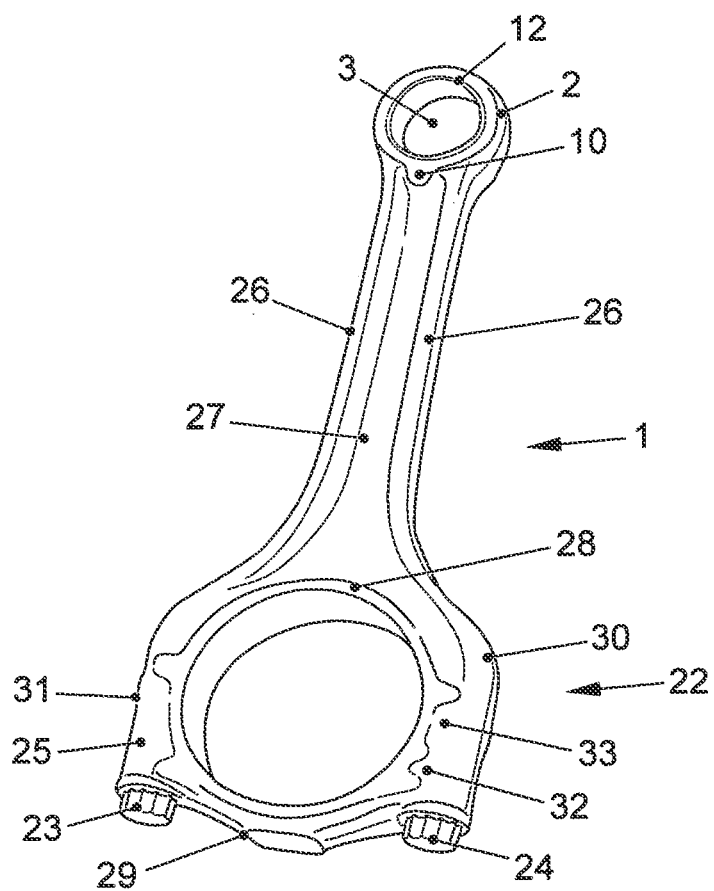
FIG. 3 is a diagrammatic perspective view of a preferred embodiment of the connecting rod according to the invention.

FIG. 3 shows a side view of the overall connecting rod 1. The connecting rod 1 includes the small end 2 with the bearing bore 3 (small eye), the connecting rod shaft 5 and the big end 22 (large eye), which is partially formed by a separate connecting rod bearing cover 25 secured separately by means of screws 23, 24.

To optimize the structure, ribs 26 extend along the edge of the connecting rod shaft 5, beginning with the lower part of the small end 2. These ribs 26 form a raised edge region of the shaft 5 and follow the external shape of the shaft. A substantially H-shaped cross section is obtained. The inner surface 27 of the shaft, between the ribs 26, runs steadily and uniformly to a stop collar 28 of the large eye, which receives the crank pin during operation.

The ribs 26 extend as far as the upper part of the big end 22. They end approximately where the connecting rod bearing cover 25 is screwed on. Another feature of the optimization of the structure and weight is the formation of a narrow connecting region 29—also referred to as a "flat"—of the connecting rod bearing cover 25, which extends between two regions or shoulders 30, 31 for receiving the connecting means—in this case the screws 23, 24. The screws 23, 24 or shoulders 30, 31 are of relatively short design in relation to known connecting rods. Recesses 32, 33 are provided within the shoulders as an aid to production. In this embodiment, two recesses 32, 33 are provided along the stop collar.

Figure 4A:
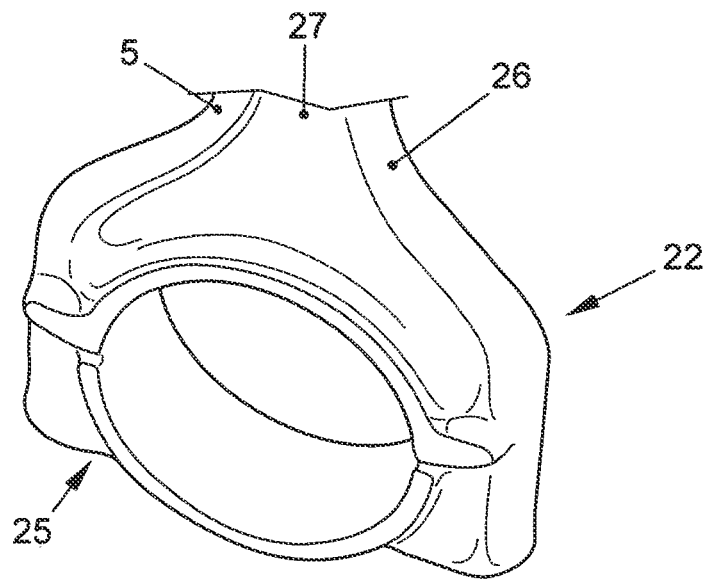
FIG. 4a is a diagrammatic perspective partial view of the connecting rod shown in FIG. 3.
Figure 4B:
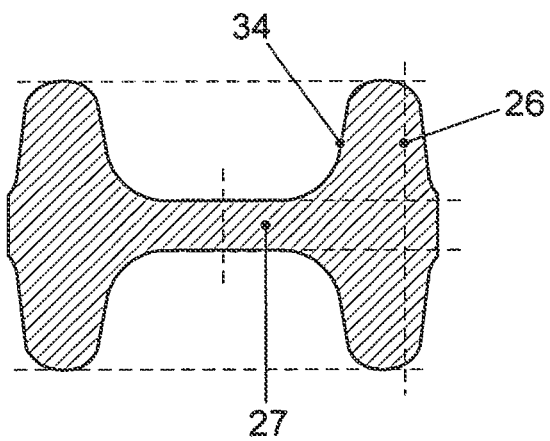
FIG. 4b is a diagrammatic cross-sectional view of the connecting rod shown in FIG. 3.

Another view of the big end and of the optimization of the structure thereof is shown by FIGS. 4a and 4b. It is clearly apparent from FIG. 4a how the ribs 26 extend into the big end 22 and end above the edge between the shaft 5 and the bearing cover 25. FIG. 4b shows the substantially H-shaped cross section of the shaft 5. The web (or the shaft inner surface 27) of the shaft 5 is made narrow in relation to that of known connecting rods. The transition 34 between the web and the ribs 26 is made relatively steep or sharply curved. In this way, it is possible significantly to reduce the oscillating mass of the connecting rod.

Figure 5:
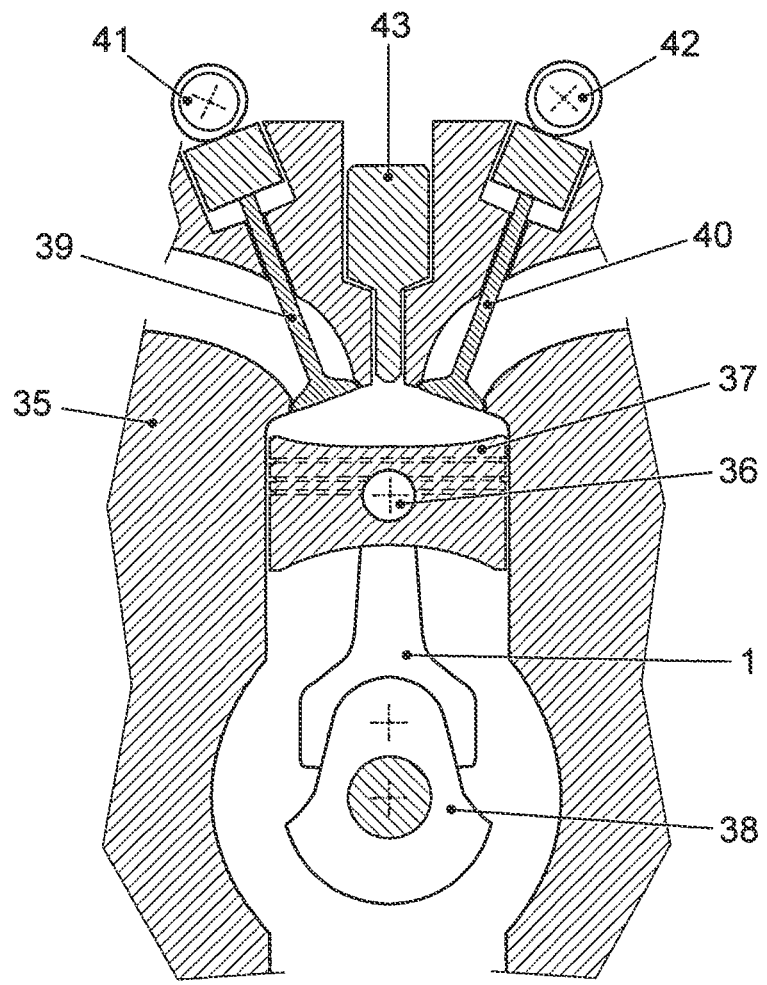
FIG. 5 is a diagrammatic cross-sectional general view for illustrating the arrangement of a connecting rod in a combustion engine in accordance with the invention.

The known use of a connecting rod 1 in a combustion engine, in an internal combustion engine (indicated schematically by crankcase 35), is illustrated with the aid of FIG. 5. While the small eye or small end 2 of the connecting rod 1 receives the pin 36 of an engine piston 37, the large eye of the connecting rod is connected to a crank pin of the crankshaft 38. An inlet and outlet valve 39, 40 and cams 41, 42 of the camshafts as well as an injection nozzle 43 are furthermore illustrated schematically. The combination according to the invention of a connecting rod and a bearing bushing is not restricted to the use of such an engine; this serves merely as an illustrative example.

According to the invention, a combination of a connecting rod 1 in the form of a "handbasket" and likewise a bearing bushing 12 in such a form are proposed. The small end 2 is preferably formed by forging. In this way, a connecting rod with an optimized weight and a bearing bushing 12 received therein is provided which has good operating properties combined with optimized suitability for production.

LIST OF REFERENCE CHARACTERS 1 connecting rod
2 small end
3 bearing bore
4 circular segment
5 connecting rod shaft
6 first region of the bearing bore
7 second region of the bearing bore
6' first region of the small end
7' second region of the small end
8 transition
9 final edge contour
10 stop collar
11 reinforcing rib
12 bearing bushing
13 main body of the bearing bushing
14 end of the bearing bushing
15 end of the bearing bushing
16 curvate edge profile
17 first—lower—region of the bearing bushing
18 second—upper—region of the bearing bushing
19 seam
20 depression
21 projecting part
22 big end
23 screw
24 screw
25 connecting rod bearing cover
26 ribs
27 shaft inner surface (web)
28 stop collar of the large eye
29 connecting region
30 shoulder
31 shoulder
32 recess
33 recess
34 transition
35 crankcase
36 pin
37 engine piston
38 crankshaft
39 net valve
40 outlet valve
41 cam
42 cam
43 injection nozzle

What is claimed is:

1. A bearing bushing (12) for a connecting rod (1) having a small end (2), which has a bearing bore (3), wherein a first region (6) of the bearing bore (3), which in operation is subjected to compressive loading, is longer than a second region (7) of the bearing bore (3), which is subjected to tensile loading, wherein the bearing bushing (12), when unconnected to the connecting rod (1), has a shape matched to a final edge contour (9) of the bearing bore (3), wherein a first region (17) of the bearing bushing (12) is likewise configured to be longer than a second region (18) thereof, wherein the first regions (6, 6', 17) both of the bearing bore (3) and of the bearing bushing (12) merge into the respective second regions (7, 7', 18) via a curvated profile (16).

2. A combination of a connecting rod (1) having a small end (2), which has a bearing bore (3), wherein a first region (6) of the bearing bore (3), which in operation is subjected to compressive loading, is longer than a second region (7) of the bearing bore (3), which is subjected to tensile loading, and of a bearing bushing (12) received in the bearing bore (3), a shape of which is matched to a final edge contour (9) of the bearing bore (3) such that the bearing bushing (12), when unconnected to the connecting rod (1), has a shape matched to the final edge contour (9) of the bearing bore (3), wherein a first region (17) of the bearing bushing (12) is likewise configured to be longer than a second region (18) thereof, wherein the first regions (6, 6', 17) both of the bearing bore (3) and of the bearing bushing (12) merge into the respective second regions (7, 7', 18) via a curvated profile (16).

3. The combination of a connecting rod (1) and of a bearing bushing (12) according to claim 2, wherein the small end (2) has a stop collar (10) on the first region (6') thereof, and the separately inserted bearing bushing (12) ends with the stop collar (10).

4. The combination of a connecting rod (1) and of a bearing bushing (12) according to claim 2, wherein a connecting rod shaft (5) formed integrally on the small end (2) has edge ribs (26) which follow the external shape of the connecting rod shaft (5) and run out toward a big end (22).

5. The combination of a connecting rod (1) and of a bearing bushing (12) according to claim 2, wherein said combination has a connecting rod bearing cover (25) secured to the connecting rod, the connecting rod bearing cover has shoulders (30, 31) for receiving connecting devices and has a connecting region (29) which extends between the shoulders (30, 31) and is remote from a connecting rod shaft (5), wherein the connecting region (29) is narrower than the shoulders.

6. The combination of a connecting rod (1) and of a bearing bushing (12) according to claim 5, wherein the connecting devices are embodied as screws (23, 24).

7. A method for producing a combination of a connecting rod (1) having a small end (2) and of a bearing bushing (12) by boring a bearing bore (3) into the small end(2), wherein a first region (6) of the bearing bore (3), which in operation is subjected to compressive loading, is longer than a second region (7) of the bearing bore (3), which is subjected to tensile loading, wherein the bearing bushing (12), the shape of which before insertion is already matched to a final edge contour (9) of the bearing bore (3), is inserted into the bearing bore (3), wherein a first region (17) of the bearing bushing (12) is likewise configured to be longer than a second region (18) thereof, wherein the first regions (6, 6', 17) both of the bearing bore (3) and of the bearing bushing (12) merge into the respective second regions (7, 7', 18) via a curvated profile (16).

8. The method for producing a combination of a connecting rod (1) having a small end (2) and of a bearing bushing (12) according to claim 7, wherein a small end (2) having a first, longer and a second, shorter region (6', 7') is formed with a bearing bore that is still closed, wherein the bearing bore (3) is introduced and wherein the bearing bushing (12) is pressed into the bearing bore.

9. The method for producing a combination of a connecting rod (1) having a small end (2) and of a bearing bushing (12) according to claim 7, wherein the small end (2) is forged.

10. The method for producing a combination of a connecting rod (1) having a small end (2) and of a bearing bushing (12) according to claim 7, wherein after the small end (2) has been shaped, a stop collar (10) is introduced in the first region of the small end (6').

11. The method for producing a combination of a connecting rod (1) having a small end (2) and of a bearing bushing (12) according to claim 10, wherein the stop collar (10) is formed by plain milling.

\* \* \* \* \*